J. C. HARRIS.
CELL POST CONSTRUCTION.
APPLICATION FILED SEPT. 20, 1919.

1,404,024.

Patented Jan. 17, 1922.

WITNESS:

INVENTOR.
Joshua C. Harris.
BY
ATTORNEY.

UNITED STATES PATENT OFFICE.

JOSHUA C. HARRIS, OF NIAGARA FALLS, NEW YORK, ASSIGNOR TO U. S. LIGHT & HEAT CORPORATION, OF NIAGARA FALLS, NEW YORK, A CORPORATION OF NEW YORK.

CELL-POST CONSTRUCTION.

1,404,024.

Specification of Letters Patent. Patented Jan. 17, 1922.

Application filed September 20, 1919. Serial No. 325,167.

*To all whom it may concern:*

Be it known that I, JOSHUA C. HARRIS, a citizen of the United States, residing at Niagara Falls, in the county of Niagara and State of New York, have invented new and useful Improvements in Cell-Post Construction, of which the following is a specification.

The present invention relates to cell post construction. In storage battery cells it is common to connect the plates of one polarity to a cell post, while the plates of the opposite polarity are connected to a second cell post. Said cell posts ordinarily extend through the cover of the cell and are connected through post straps or other conductors to a circuit outside of the cell.

When the storage battery cells are used in a service wherein they are subjected to vibration, as for instance, in motor cars, there is likely to be relative movement between the cell post and the cell cover which results in the creeping of electrolyte along said cell post to the exterior of the cell. Various expedients are in use for preventing this creeping of the electrolyte along the cell posts. The present invention relates to improvements of this nature.

An object of the present invention is to provide a simple structure which is cheap to manufacture and which will effectually prevent the creepage of electrolyte above referred to.

A further object is to provide a simple method of sealing the cell post to the cell cover which will involve little, if any more trouble and expense than is involved in the ordinary method of assembling storage battery cells without means for preventing creepage of the electrolyte.

Further objects will appear as the description proceeds.

Figure 1:
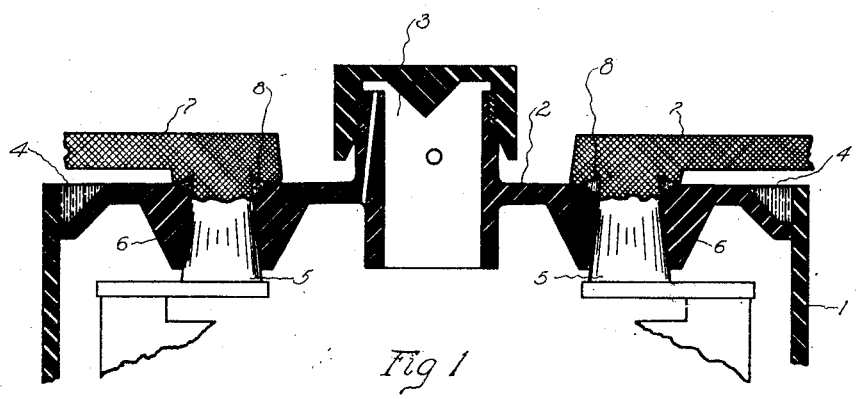
Figure 1 is a sectional view of a cell illustrating the present invention.

The walls of a storage battery cell are indicated by the numeral 1. The storage battery cell is provided with a cover 2 which may be provided with a filling aperture 3. The details of the structure of the cover as regards the filling aperture form no part of the present invention and need not be described herein. The cover 2 will ordinarily be tightly sealed to the walls 1 by means of sealing compound 4.

A pair of cell posts 5, 5 are illustrated, which extend through the cover 2. The cover 2 may be reinforced at the regions through which the cell posts extend, as illustrated by the bosses 6, 6 which extend downwardly from the under side of the cover and surround the posts 5, 5. The cell posts are connected to a circuit outside of the cell by means of the straps 7, 7. The straps 7, 7 are, in the ordinary practice of assembling storage battery cells, united to the posts 5, 5 by a puddling or burning process, the posts and the straps being ordinarily composed of readily fusible metal as, for instance, lead or alloy, or compound thereof.

Figure 2:
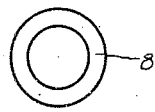
Figure 2 is a detail.

According to the present invention, a recess is provided between each strap 7 and the cover 2, said recess surrounding the post 5. Both the strap 7 and the cover 2 may be slightly dished or recessed to provide an annular space, or one only of these members need be recessed. This recess is filled by an annular member 8 of sealing material or compound, illustrated in plan view in Fig. 2. The sealing compound may be any of the well known varieties. It is only necessary that said compound will fuse when heated to a few degrees higher than the temperature encountered in storage battery practice.

In assembling the cell, a strap 7 is mounted over a post 5 with the annular member 8 of sealing compound between the strap 7 and the cover 2 and surrounding the post 5. The strap 7 is united to the post 5 by burning or puddling. The heat required for this puddling process will fuse the annular member 8 of sealing compound, whereby said sealing compound will flow into intimate contact with both the post 5 and the cover 2. Upon cooling, the sealing compound 8 will form an effective seal between said post and the cover, whereby to prevent the creepage of electrolyte therebetween. It will not be necessary to provide a perfect fit between the bore of the boss 6 and the post 5 for the reason that the heat communicated to the post will not extend sufficiently far down the post to keep the compound 8 in liquid condition, if the compound 8 should have a tendency to run down the post. The construction and method of assembling are simple and do not require accuracy of workmanship. Furthermore, the seal between the post and cover is quite effective.

Many modifications will occur to those skilled in the art. It is intended in this patent to cover all such modifications that come within the scope of the invention as defined by the appended claims.

What I claim as new and desire to secure by Letters Patent of the United States, is—

1. In combination, a cell cover, a cell post extending therethrough, and a connecting strap, said cover and strap being recessed to form an annular space surrounding said post.

2. In combination, a cell cover, a cell post extending therethrough, and a connecting strap, said cover and strap being recessed to form an annular space surrounding said post, said space being filled with sealing compound.

3. The method of sealing a cell post to a cell cover which consists of providing a cell post, a cell cover and a strap with an annular space between said strap and said cover surrounding said post, mounting an annular ring of sealing compound in said recess and fusing said compound.

4. The method of sealing a cell post to a cell cover which consists of providing a cell post, a cell cover and a strap with an annular space between said strap and said cover surrounding said post, mounting an annular ring of sealing compound in said recess and fusing said strap to said post with a sufficient amount of heat to fuse said compound.

5. In combination, a cell cover, a cell post extending therethrough and a connecting strap, said cover and strap forming between them an annular space surrounding said post.

6. In combination, a cell cover, a cell post extending therethrough, and a connecting strap, said cover and strap being recessed to form an annular space surrounding said post, said space being filled with sealing compound.

7. Cell construction having, in combination, a cell cover, a post extending therethrough, a strap united to said post, and an annular member of sealing compound between said strap and said cover intimately united to said post and said cover.

In witness whereof, I have hereunto subscribed my name.

JOSHUA C. HARRIS.